United States Patent [19]

Conant

[11] 3,951,174

[45] Apr. 20, 1976

[54] TUBE ORIFICE FOR PRESSURE DISPENSING CONTAINER

[76] Inventor: James E. Conant, P.O. Box 843, Bozeman, Mont. 59715

[22] Filed: Apr. 25, 1972

[21] Appl. No.: 247,417

Related U.S. Application Data

[63] Continuation of Ser. No. 3,363, Jan. 16, 1970, abandoned.

[52] U.S. Cl. .............................. 138/150; 138/122; 138/129; 138/154
[51] Int. Cl.² ......................................... F16L 11/02
[58] Field of Search ........... 138/122, 123, 129, 154, 138/42, 144, 150; 57/139, 140 R, 140 C; 87/1, 3, 5, 9

[56] References Cited
UNITED STATES PATENTS

| | | | |
|---|---|---|---|
| 7,063 | 4/1876 | Preston | 57/139 |
| 1,972,523 | 9/1934 | Kennedy | 138/125 |
| 2,366,853 | 1/1945 | Greene | 87/1 |
| 2,755,535 | 7/1956 | Schoenberger | 138/125 |
| 3,205,913 | 9/1965 | Ehlers | 138/125 |
| 3,474,703 | 10/1969 | Davis et al. | 87/1 |

*Primary Examiner*—Herbert Goldstein
*Assistant Examiner*—Anthony V. Ciarlante
*Attorney, Agent, or Firm*—Newton, Hopkins & Ormsby

[57] ABSTRACT

A tubular device for providing a very small passageway suitable for discharging a product and a pressurized material from a container of the aerosol type, wherein the product and the material are disposed, upon opening of a control valve at one end of the tubular device. The tubular device is formed by twisting a plurality of elongate filaments in a rope-like fashion along the lengths thereof to forcefully close the surfaces of the filaments together along the entire length, thereby providing an elongate passageway between the twisted filaments. The exposed surfaces of the twisted filaments are coated with a suitable material for sealing the tube along its entire length.

7 Claims, 6 Drawing Figures

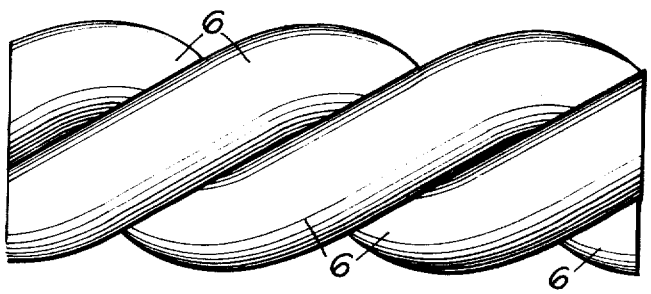
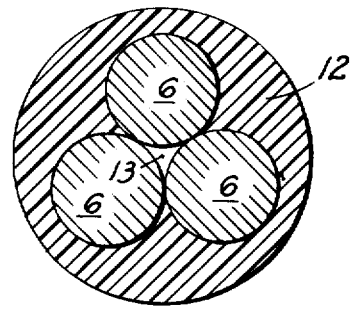
FIG 1    FIG 2
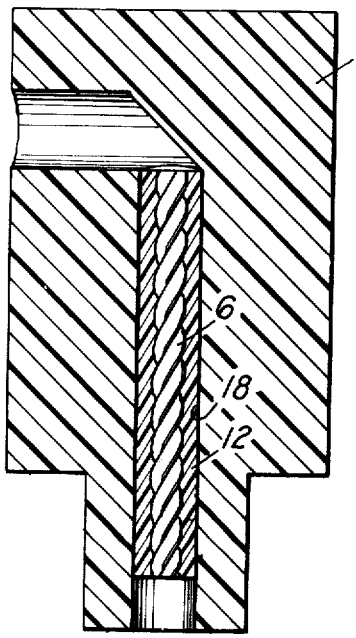
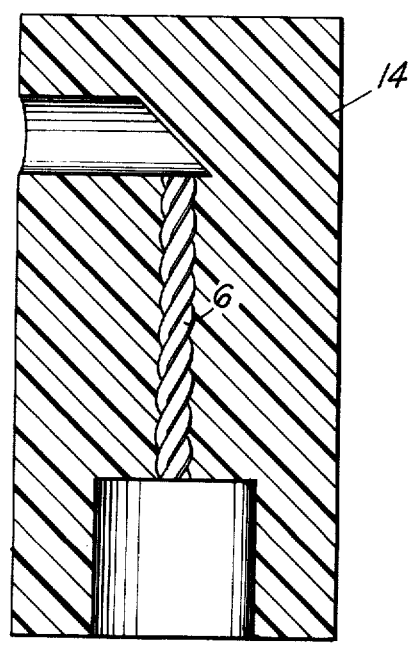
FIG 3    FIG 4
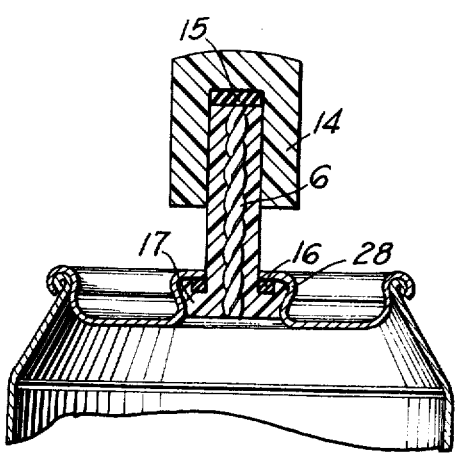
FIG 5A
INVENTOR
JAMES E. CONANT
BY: Newton, Hopkins, Ormsby
ATTORNEYS

TUBE ORIFICE FOR PRESSURE DISPENSING CONTAINER

This is a continuation of application Ser. No. 3,363, filed Jan. 16, 1970, now abandoned.

BACKGROUND OF THE INVENTION

This invention generally relates to pressure feeding devices and more particularly to a device for propelling or dispensing a material from a container having a source of gas or propellant vapor under super atmospheric pressure therein and an outlet valve having a spray orifice through which the material is discharged.

One well known form of this type of device is the common household aerosol type dispensing container which is adapted to dispense a product such as, for example, an insecticide, deodorant, perfume or the like in a spray form when a valve is manually opened. A pressurized gas or vapor disposed within the dispensing container and usually mixed with the material to be dispensed therefrom, upon opening of the outlet valve to the lower atmospheric pressure surrounding the outside of the container, causes such material to be discharged in a spray through the outlet valve. The rate of flow or delivery rate through the outlet valve is generally dependent upon a variety of factors such as the viscosity and density of the mixture or product being dispensed, the pressure in the dispensing container, and the design of the valve mechanism. Within the valve design, it is the passageway therein having the smallest cross-sectional area or diameter which essentially determines the rate of delivery which the valve portion of the dispensing container will provide. This passageway may be disposed in the lower end of the container in the valve stem or diptube, internally in the body structure, or in the actuating button at the mouth of the container for opening the valve, as desired, and in any one of these positions still controls the valve delivery rate.

Much difficulty has heretofore been experienced in the manufacture of aerosol dispensing containers of the type described, especially in providing and maintaining very small passageways having diameters on the order of thousandths of an inch which are necessary in many cases for providing the most suitable flow rate through the valve of the dispensing container. Capillary tubes have been used for the purpose, but the disadvantage even with these has been the limitations from a manufacturing standpoint of providing passageways of sufficiently small diameters and including the similar narrow tolerances demanded thereby.

SUMMARY OF THE INVENTION

Accordingly, it is an object of the present invention to provide a novel tubular device offering a passageway having a very narrow diameter.

Another object of the present invention is to provide a novel tubular device having a passageway diameter measuring less than one hundredth of an inch.

Still another object of this invention is to provide an improved passageway construction for use in dispensing a material from a pressurized container.

The foregoing and other objects are attained by a passageway construction formed by twisting or braiding a plurality of elongate filaments in a rope-like fashion to forcefully close the surfaces of the filaments together along the entire length thereof and in this manner provide a central elongate passageway therebetween. A suitable material is extruded over the outer exposed surfaces of the twisted filaments for sealing the passageway construction formed thereby. This construction is especially suitable for use in aerosol containers or similar dispensing containers for providing a very small passageway through which the contents of the container may be discharged at a predetermined flow rate not heretofore obtainable.

BRIEF DESCRIPTION OF THE DRAWINGS

Other objects, features and advantages of the present invention will be readily appreciated as the same become better understood from the following detailed description when considered in connection with the accompanying drawings, in which like reference numerals designate like or corresponding parts, and wherein:

FIG. 1 is a longitudinal view of the twisted filaments forming the passageway construction according to the teachings of the present invention;

FIG. 2 is a cross-sectional view of a tubular device formed in accordance with the teachings of the present invention formed from three filaments of equal diameters and coated with a suitable sealing material;

FIG. 3 is a cross-sectional view of the tubular device illustrated in FIG. 2 being positioned in the actuating cap or button of a dispensing container valve system;

FIG. 4 is a cross-sectional view of the filament tubing in the actuating cap or button of a dispensing container and placed therein during the process of forming the cap;

FIG. 5A shows a foreshortened view in cross-section of a container body and an enclosed valve device therefor which utilizes the twisted filament tubing arrangement as a capillary tube for dispensing the contents of the container.

DETAILED DESCRIPTION OF THE ILLUSTRATED EMBODIMENTS

Figure 5:
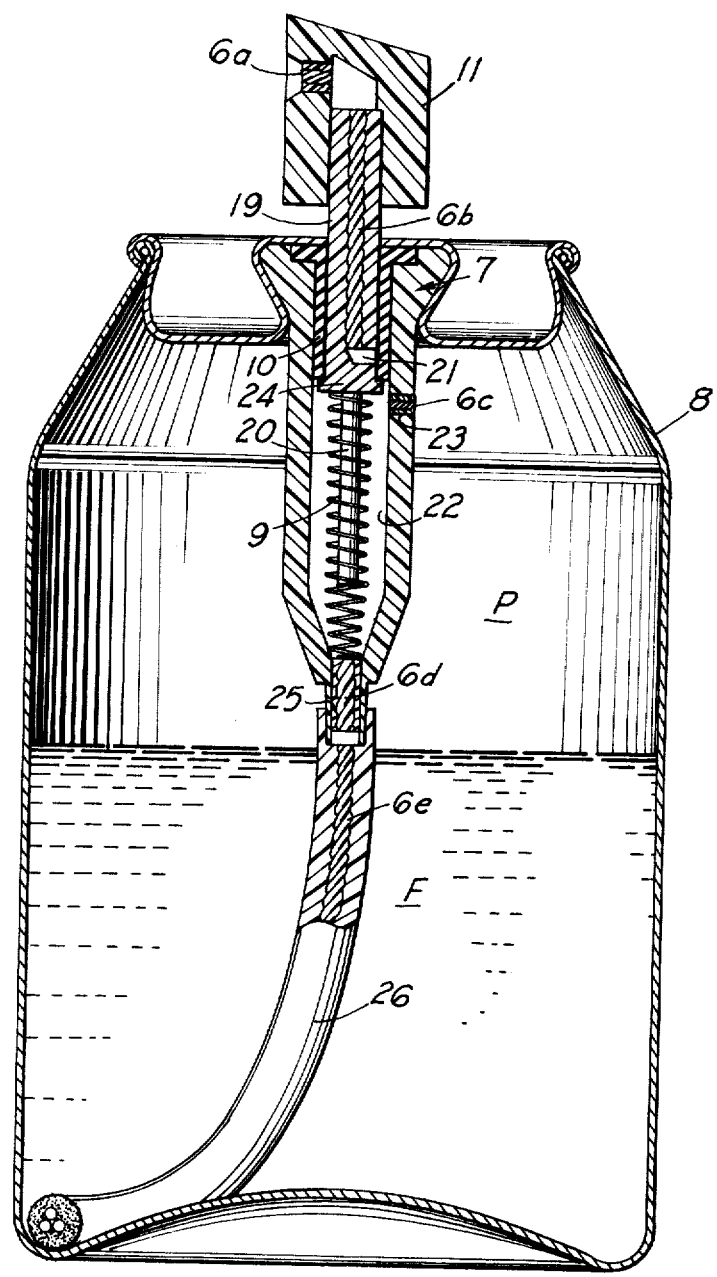
FIG. 5 shows a sectional view of a valve device enclosed in a dispensing container embodying different placements of the filament tubing arrangement of the present invention in the actuating cap, the valve stem, the spring body and the diptube thereof.

Referring now to the drawings, and more particularly, to FIGS. 1 and 2 thereof, the tubular device for passageway construction of the present invention is shown being formed from three generally smooth-surfaced strands or filaments 6 of a suitable ductile material, such as drawn metal strands, glass strands, plastic strands, or strands of other suitable material, usually of a non-absorbant characteristic, which are twisted or braided along the entire axial lengths thereof by any suitable means in the same manner that a cord or rope is fabricated from the strands thereof. The twists are equalized in order to cause the surfaces of the filaments 6 to be closed into contact with each other along the entire length of the device in order to uniformly maintain the cross-sectional configuration of the axial enclosed area or passageway 13 defined therebetween.

An impervious and continuous circular coating 12 of a suitable plastic or resin-based matrix is applied to the outer exposed surfaces of the twisted or braided filaments 6 to seal the enclosed area or passageway 13 for permitting fluids to be transmitted therethrough. The coating material 12 is of such composition and consistency at the time of application to the outer surfaces of the filaments 6 that seepage through the contacting surfaces of the filaments 6 into the passageway 13 is prevented, and in this manner, the diameter and the configuration of the enclosed passageway 13 are maintained. One manner in which the coating material 12 may be applied is like that in which insulation is applied to electric cables and the like, by heat and pressure application, in the extrusion of polyethylene thereon. As shown in FIG. 2, the cross-sectional geometric configuration of the passageway 13 is substantially triangular in shape. It is to be understood, however, that this configuration is dependent upon the number of filaments utilized in forming the passageway 13 and that, in the case of four such filaments, the configuration would be substantially square.

In FIG. 3, an actuating cap or button 11 for a dispensing container, not shown, is provided with a preformed passageway 18 and the twisted-filament tubular device, coated by a suitable material as aforedescribed, is force fitted therein. Other means of affixing the coated filament tube in the passageway 18 of the container actuating cap 11 are, of course, possible and will be readily apparent to those skilled in the art.

Turning to FIG. 4, for example, it may be seen that the coating can be applied by utilizing the material comprising the body of the valve itself, serving as a matrix, during the molding process, in this case, the material forming the valve actuating cap 14.

Referring now to FIG. 5 for an illustration of the various parts of a dispensing container, wherein the filament tubing arrangement 6 hereinabove described may be usefully applied for providing a passageway of sufficient narrowness, there is shown a dispensing container or aerosol can 8 of conventional form having an actuating cap 11 thereon for manually operating a dispensing valve 7 to discharge the contents of the can 8 through one of the twisted filament passageway constructions 6a suitably disposed in a radial bore or aperture therein. The valve 7 is centrally disposed within the upper portion of the can 8 and is connected to the actuating cap 11 by a vertically oriented, cylindrical-shaped valve stem or core 19 having an elongate bore in one end thereof in which there is positioned another of the twisted filament passageway constructions 6b and a reduced cross-sectional length or rod 20 at its other end. A radial bore 21 in the valve stem 19 provides a fluid communication path to the interior end of the elongate bore therein and thus to the passageway construction 6b, the purpose of which will be hereinafter set forth.

The valve 7 generally is an elongated cylinder having a central passage 22 and a number of radial apertures 23 formed in the side thereof in which still other twisted filament passageway constructions 6c formed in accordance with the teachings of this invention may be disposed for increasing the flow of compressed gas or gas under super-atmospheric pressure from within the can 8 into the valve body. Inside the passage 22 of the valve 7, a helical compression spring 9 surrounding the stem rod 20 and biased between the stem 19 and the lower interior end of the valve cylinder 7 holds the valve stem in an elevated position in the cylinder passage 22, wherein an annular flange or ridge 24 on the stem just below the radial bore 21 abuts the lower end of a substantially tubular rubber grommet 10 disposed about the stem 19 and within the upper end of the valve cylinder 7, whereby the radial bore 21 is sealingly engaged within the grommet.

At the lower end of the valve 7, a small bore 25 of substantially less diameter than the passage 22 leads from the passage 22 to a conventional diptube 26 that extends down into the peripheral valley formed by the concave can bottom. Within this bore 25, there may be positioned yet another filament passageway construction 6d which controls the flow of fluids through the diptube 26, as shown, or alternatively, in the absence of such an additional tube 26, may serve as a simple vapor cap. Another twisted filament passageway construction 6e is shown being axially positioned within the diptube 26 along the entire length thereof for regulating the flow of the product mixture therethrough.

Thus, upon pressing the actuator cap or button 11 inwardly of the can 8, the valve stem 19 is forced to move axially within the passage 22 of the valve cylinder 7 toward the end thereof most remote from the stem 19, compressing the spring 9 during such movement, whereby the radial bore 21 in the stem 19 becomes clear of the sealing grommet 10 and freely communicates with the passage 22 in the main valve body 7. When this occurs, material contained within the can 8 is dispensed therefrom, being forced through the twisted filament passageway constructions 6e and 6d, radial bore 21 in the stem 19, and the passageway constructions 6b and 6a by the compressed gas therein. The container can 8 can be filled with the product formulation by a conventional means before the cup is sealed in place, or it can be introduced, for example, through a filling grommet, not shown, of flexible rubber-like material fashioned to permit the introduction of the pressure source material through the bottom of the can or filled by other means.

In FIG. 5A, another method of controlling the flow through the capillary tube or novel twisted filament passageway construction 6 of this invention is illustrated. A conventional internal threaded cap, not shown as such in the sketch, 14 having a rubber-like sealing gasket 15 disposed in the base of the bore therein is positioned on a standard 1-inch mounting or closure cap 28 for aerosol type dispensers. Another rubber-like sealing gasket 16 is used as a pressure and liquid seal and additionally helps to seat the substantially tubular device 17 in the cup 28. The surface coating of the twisted filament passageway construction 6 positioned in the tubular device 17 is shown as being the same material from which the tubular device 17 is fabricated, such as, for example, polyethylene or polyvinyl compounds, though other materials may be used just as well. In this embodiment, it is readily apparent that the threaded cap 14 must be removed from the can 8 before the device may be actuated in a known manner, as by manually applying a side or lateral force against the top of the tubular device 17.

Although the twisted filament passageway constructions illustrated herein are formed from three filaments of equal diameters, it is to be understood that they may also be formed from single strands or filaments of different diameters and of different materials, if desired, and can be more than three in number, so long as the geometrical configuration of the passageway 13 formed thereby is maintained uniform throughout the length of the twists. Obviously, the shape or particular geometrical configuration obtained is dependent upon the number of strands or filaments used in forming the passageway.

It will be understood that the pressure dispensing device commonly known as the aerosol type dispenser is shown herein only in terms of description and not of limitation for defining the use of the twisted filament passageway construction. Thus, the invention is not confined to the specific use described herein, but may be used in controlling other fluid pressure systems and in other pressure regulating valve devices.

Obviously, other modifications and variations are possible in light of the above teachings. It is to be understood, therefore, that within the scope of the appended claims, the invention may be practiced otherwise than as specifically described.

I claim:

1. An elongate substantially tubular device for conducting fluids comprising:
   a. a plurality of filaments, not more than four, constructed of substantially smooth impervious and ductile material, said filaments being uniformly and forcedly twisted together along their entire length to close the surface of said filaments to define a single axial passageway therebetween; and
   b. a coating of material on the outer exposed surfaces of the twisted filaments, said coating being in sealing contact with the outer surfaces of the filaments throughout their length but not penetrating into said axial passage, and having a smooth cylindrical outer surface means for sealingly fitting into a cylindrical bore.

2. A tubular device as in claim 1 comprising only three filaments.

3. A device as in claim 1 wherein the filaments are metal.

4. A device as in claim 1 wherein the filaments are glass.

5. A device as in claim 1 wherein the filaments are plastic.

6. In a fluid dispensing device having a container portion provided with a top having a cylindrical bore through which fluid within the container portion is to be dispensed, the combination of:
   a. a plurality of filaments, not more than four, constructed of substantially smooth impervious and ductile material, said filaments being uniformly and forcedly twisted together along their entire length to close the surface of said filaments to define a single axial passageway therebetween; and
   b. a coating of material on the outer exposed surfaces of the twisted filaments, said coating being in sealing contact with the outer surfaces of the filaments throughout their length but not penetrating into said axial passage, and having a smooth cylindrical outer surface sealingly fitted into said cylindrical bore of the container portion so as to permit dispensing of said fluid through said axial passageway.

7. A dispensing container nozzle comprising an elongate outer body portion having a smooth, cylindrical outer surface at least at one end portion thereof whereby to present a plug adapted to fit sealingly within a cylindrical bore of a dispensing container; and
   means for defining a passageway axially through said outer body portion whereby to dispense fluid from a dispensing container through said one end of the outer body portion to the opposite end thereof, said means consisting of three filaments each having a smooth outer surface, said filaments being helically twisted together tightly to interengage all of the three said outer surfaces thereof and thereby define said axial passageway, and said filaments being embedded within said outer body portion substantially centrally thereof and extending from said one end to said opposite end thereof.

* * * * *